Patented Aug. 30, 1949

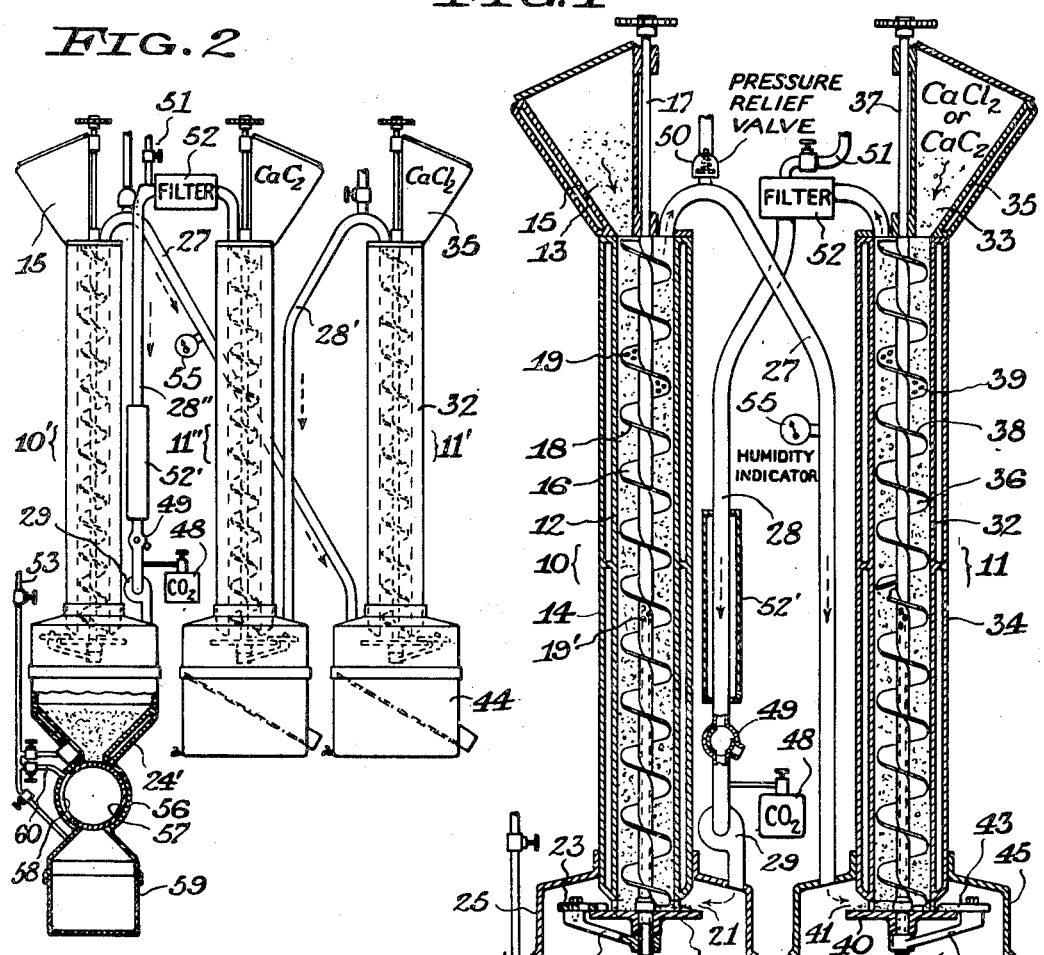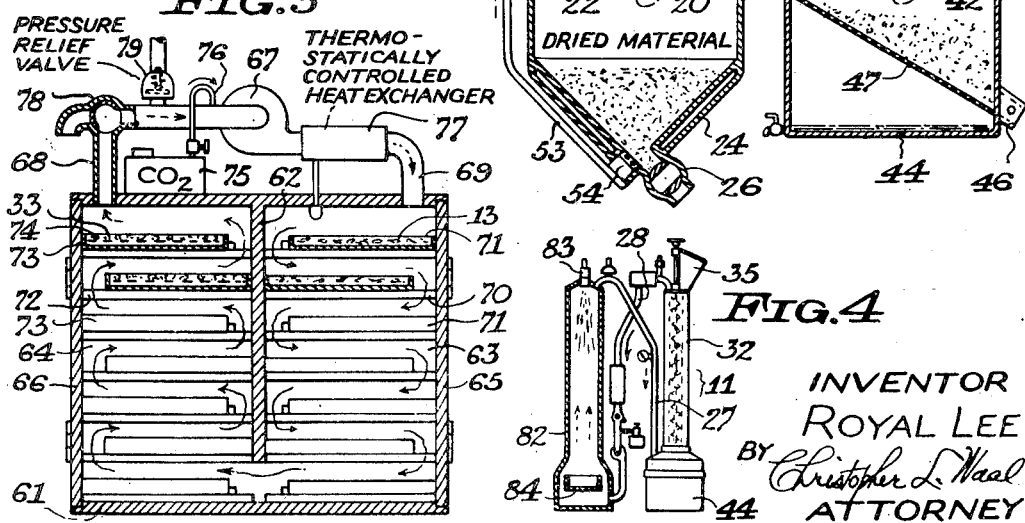

2,480,146

UNITED STATES PATENT OFFICE 2,480,146

METHOD AND APPARATUS FOR DEHYDRATION

Royal Lee, Milwaukee, Wis., assignor to Lee Foundation for Nutritional Research, Milwaukee, Wis., a corporation of Wisconsin Application February 2, 1944, Serial No. 520,759

4 Claims. (Cl. 34—13)

The present invention relates to a method and apparatus for dehydrating foodstuffs and other perishable organic material.

It is an object of the invention to provide an improved method of dehydrating organic material wherein the material is subjected to a circulating drying gas non-injurious to the material, and the water vapor evolved from the material is removed during the circulation of the gas.

It is also an object to provide a method of dehydrating organic material, such as citrus fruit peel, pulp and juice, which will minimize loss of the volatile oils, flavors and vitamins.

Another object is to provide a dehydrating method which will facilitate subsequent reconstitution of the dried material by the addition of water.

Still another object is to provide a dehydrating method in which the water vapor evolved from the material will combine chemically with a drying agent to decompose the water vapor and to liberate a drying gas.

A further object is to cause the evolved water vapor in the circulating gaseous medium to liberate acetylene gas, as from calcium carbide, the reaction proceeding in a smooth, controllable manner and at a relatively low temperature.

A still further object is to provide an improved apparatus for carrying out the method of the invention.

The invention further consists in the several features hereinafter described and claimed.

In the accompanying drawing,

Fig. 1 is a schematic sectional elevation of one form of dehydrating apparatus arranged in accordance with the invention for carrying out the method of the invention;

Fig. 2 is a schematic elevation of another form of apparatus;

Fig. 3 is a schematic sectional elevation of a further form of apparatus, and

Fig. 4 is an elevation, partly in section, of still another form of apparatus.

In carrying out the method of the invention, the foodstuff or other organic material to be dehydrated is subjected to the action of an inert or non-oxidizing gas which circulates in a closed system or circuit and passes over a suitable absorbent or drying agent, the water vapor evolved from the material and entrained with the gas being removed by the drying agent. In the case of citrus fruit peel and the like, the essential oils and flavors tend to remain in the material, which becomes more absorbent for these substances as the water is withdrawn. Some of the more volatile substances may be taken up by the gas, but are recirculated with the gas, thus limiting the loss of these substances. The drying agent or desiccant used is one, such as calcium chloride, which has a selective affinity for water vapor and will not absorb the volatile factors to any substantial degree, particularly after absorption of water vapor. However, the drying agent, to the extent of its absorption capacity for the volatile factors, will become saturated with these factors. Carbon dioxide is a suitable drying gas and permits easy dehydration. As hereinafter more fully described, acetylene gas may be used as the drying gas and calcium carbide as the drying agent.

A solid material, such as citrus fruit peel, is prepared for dehydration by reducing it to small pieces, such as granules, chips, shreds, or flakes, although in some instances it may be reduced to a powder. It is desirable to effect the reduction in a cold non-oxidizing atmosphere, such as of carbon dioxide gas. This gas is preferably furnished by the sublimation of solid carbon dioxide which in its solid form is mixed and reduced or mechanically disintegrated with the material so as to absorb the frictional heat developed during reduction or disintegration. In some instances, the water-bearing material may be frozen before reduction, and dehydrated while in frozen condition, the water vapor passing off by sublimation. Freezing is suitable for materials containing substantial amounts of water, such as fruit pulp and juice, cane juice, and honey. In the case of thick syrupy materials, such as honey, some water may be added to facilitate freezing.

During the drying operation the pieces or particles of the material, especially when frozen, will tend to retain their original volume, although the water content will be reduced. The pieces of material will therefore become porous, avoiding the formation of an impermeable coating or film thereon and facilitating the drying. The porous structure of the dried material also facilitates the reconstitution of the material by the addition of water.

In special instances, where a sealing film tends to form on the material, after some of the water is removed, the partially dried material is reduced or mechanically disintegrated to break up the evaporation-retarding film, and is then further dried. The reduction of the partially dried material can be effected in any suitable manner.

The apparatus of Fig. 1 comprises a material-drying unit 10 and a gas-drying unit 11 which are connected as hereinafter described to form a closed gas circuit. The unit 10 includes a conduit 12 through which the reduced organic material 13 and the drying gas travel in opposite directions. The conduit is preferably vertical and is here shown to be in the form of a tube or tower forming therein a chamber through which the material passes downwardly. The tube has a jacket 14 to receive a fluid medium for either heating or cooling the material, depending on the nature of the material, and the jacket is partitioned to provide zones of different temperature along the tube. In cases where the material is heated the temperature of the material preferably does not exceed 135° Fahrenheit. In the case of frozen material the jacket is preferably cooled. A covered jacketed supply hopper 15 is mounted at the upper end of the tube 12 for feeding the material into the tube. The descent of the material through the tube is suitably retarded as by a slowly driven screw 16 fitting loosely in the tube, the screw having a central shaft 17 with a helicoidal flight 18 which preferably slopes outwardly from the shaft toward the iner walls of the tube. The material moves slowly downward in the tube in a loose condition and is dried by the upflowing gas. The material is agitated by the screw, which preferably rotates in a direction tending to lift the material. A sufficient clearance is present between the inner walls of the tube and the periphery of the screw flight to permit passage of the material. In some instances the screw flight is provided with apertures 19 to pass the material and the gas. The loose condition of the material avoids undue obstruction to the upward passage of the gas and facilitates dehydration. The lower part of the shaft 17 may be hollow and provided with gas outlets 19'.

A horizontal disk 20 is disposed centrally below the lower end of the tube 12 and is spaced downwardly therefrom to form a discharge slot or opening 21. The material 13 in the tube descends to the disk and then flows or spreads outwardly through the opening 21 toward the periphery of the disk. An arm 22 is attached to the lower end of the conveyer shaft 17 and has secured thereto a radially adjustable scraper blade 23 engaging the upper surface of the disk to remove the loose dried material from the disk. The dried material falls from the periphery of the disk into a suitable jacketed receptacle 24, here shown to be a hopper, the lower end of the tube 12 having an enlarged skirt 25 which is detachably secured to the upper edge of the receptacle, so as to form a closed chamber. The hopper has a valved outlet 26 for discharge of the dried material. The scraper arm 23 is here shown to be rotatable with respect to the disk 20, but this relation may be reversed.

The gas-drying unit 11 is generally similar in construction to the material-drying unit 10 and includes a tube or tower 32 with a partitioned jacket 34. The tower 32 has a covered jacketed supply hopper 35 adapted to receive a suitable drying agent 33, such as calcium chloride. A slowly driven screw 36 fits loosely in the tube and has a shaft 37 and a helicoidal flight 38. In some instances the screw flight 38 may be provided with small openings 39. A horizontal supporting disk 40 is disposed centrally below the tube 32 and defines therewith an intervening annular discharge passage 41. The moisture-laden calcium chloride is removed from the supporting disk by a rotating arm 42 having a scraper blade 43, and falls into a receptacle 44 the upper edge of which is secured to an enlarged skirt 45 on the lower end of the tube. The receptacle 44 has a valved outlet 46 for the calcium chloride and has an inclined screen 47 to permit drainage of water from the calcium chloride, the screen sloping toward the outlet 46.

A gas pipe 27 connects the upper end of the tubular conduit 12 of the material-drying unit 10 with the skirt 45 at the lower end of the tubular conduit 32 of the gas drying unit 11, and a gas pipe 28 connects the upper end of the conduit 32 with the skirt 25 at the lower end of the conduit 12, thus forming a closed path or circuit for the drying gas. A blower 29 is disposed at a suitable point in the gas circuit, here shown at the lower end portion of the gas pipe 28. A valved supply container 48 for carbon dioxide is connected to the intake of the blower, and a normally closed purging valve 49 is disposed in the gas pipe 28 near the carbon dioxide inlet. A pressure relief valve 50 is placed at any suitable point in the gas conduit, and is here shown to be connected to the gas pipe 27. The gas return pipe 28 is provided with a valved outlet 51 and a filter 52 to remove dust and other foreign substances. A valved gas outlet 53 is connected to a screen 54 at the bottom of the hopper 24 in cases where it is desired to pass any excess gas through the cold dried material before the gas is vented. A humidity indicator 55 is connected to the pipe 27, and a heat-exchanger 52' surrounds the pipe 28 to maintain the desired gas temperature.

In preparing the apparatus of Fig. 1 for operation, it is desirable to replace the air with carbon dioxide gas. This can be done by opening the purging valve 49 for a short time while the blower 29 is running, and supplying the gas from the container 48. The gas passes upwardly through the conduit 12, downwardly through the pipe 27, upwardly through the conduit 32, and downwardly through the pipe 28 to the purging valve. The purging valve is then closed to the position shown in Fig. 1. When the system is to operate at a low temperature the entire apparatus is suitably chilled, as by passing a refrigerating fluid through the various jackets and admitting solid carbon dioxide in the system.

In operation, the reduced organic material 13 is placed in the hopper 15, and reduced or granular calcium chloride is placed in the hopper 35. These materials pass slowly down the respective tubes 12 and 32 in which the agitator screws rotate. The drying gas passes upwardly through the tube 12, dehydrating the material 13 which moves downwardly through the tube. The moisture-laden gas then passes along the pipe 27 and upwardly through the tube 32 where the gas is dried by the downwardly moving calcium chloride. The dried gas then passes through the pipe 28 to the blower 29 and is recirculated through the system. The circulating gas is approximately at atmospheric pressure, although, if desired, it may be maintained at higher or lower pressures. In its gradual downward passage through the tube 12, the material 15 becomes dehydrated to the desired degree, the drier portions of the material at the lower end of the tube meeting the incoming dry gas. The dried material finally reaches the supporting disk 20 from which it is removed by the rotating scraper blade 23, the material falling into the hopper 24 from which it is removed through the valved outlet 26. The rate of flow of the material can be regulated by adjusting the scraper blade 23. The calcium chloride moves slowly down the tube 32 and is finally deposited on the screen 47 in the receptacle 44, any excess moisture draining through the screen. The drained calcium chloride is removed at intervals through the valved outlet 46 and may be reconditioned for further use.

When the apparatus is used to dehydrate citrus fruit peel, such as lemon peel, the dehydrated peel will retain to a large extent its volatile flavors and essential oils and its vitamins. While some of the volatiles will be taken up by the circulating gas, they will not be removed to any appreciable extent in the gas-drying operation, thus causing the gas or atmosphere to become rich in the volatiles after an initial period of operation, preventing undue loss of the volatiles. As the peel dries it becomes more absorbent for the oils. If it becomes necessary to vent some of the gas, this is preferably done through the pipe 53, the gas passing through the cold dried material in the jacketed hopper 24 so that the volatiles in the gas will condense on the material. Citrus fruit peel is preferably dehydrated at room temperature or slightly thereabove.

When the apparatus is used to dehydrate frozen material, the jacketed tube 12 is kept at a sufficiently low temperature to prevent any substantial thawing of the material, the water vapor being removed by sublimation. The pieces of material tend to keep their original volume and become porous and friable. If desired the material may be partially dried at a low temperature, and then further dried at a higher temperature.

Instead of using carbon dioxide as the drying gas it is also possible to use other non-oxidizing gases, such as hydrogen and acetylene. In the case of acetylene, calcium carbide is substituted for the calcium chloride in the tube 32. When using this gas it is desirable to purge the system of oxygen, as by evacuating the system or by sweeping out the oxygen with carbon dioxide gas. During the drying operation the moisture in the gas passing up the tube 32 combines chemically with the calcium carbide to form calcium hydroxide and acetylene. Excess acetylene is vented from the system and can be utilized in various ways, as in forming acetylene black, or for use in heating appliances.

The generation of acetylene gas from calcium carbide by circulating water vapor, rather than by water in the liquid phase, is advantageous in that the reaction is smooth and controllable, high temperatures are avoided and undesired chemical reactions are prevented. Calcium carbide may contain such impurities as potassium which on contact with water in the liquid phase may cause a spark.

The modified form of apparatus shown in Fig. 2 is generally similar to the apparatus of Fig. 1, and includes a material-drying unit 10' and a pair of gas-drying units 11' and 11" connected in series. At its lower end the material-drying unit 10' has a jacketed hopper 24' to receive the dried material. The outlet of the hopper 24' communicates with the upper end of a valve body 56 having therein a rotary hollow valve 57 with a peripheral port 58, the lower end of the valve body communicating with a detachable receptacle 59. A valved gas vent pipe 60 connects with the valve body. If desired, the supply hopper 15 may be provided with a material-transfer device, like the device 56, 57.

When dried material is to be discharged, the ported rotary valve 57 is turned to permit the material to drop therein from the hopper 24'. The valve is then turned to the position shown in Fig. 2, closing the lower end of the hopper and permitting the gas trapped within the valve to be vented off through the pipe 60. A further turning of the valve allows the material to drop into the receptacle 59.

The gas drying units 11' and 11", which are identical in construction, respectively receive calcium chloride and calcium carbide as the drying agents. A gas pipe 27 connects the top of the material-drying unit 10' with the lower end of the gas-drying unit 11'. A gas pipe 28' connects the top of the gas-drying unit 11' with the lower end of the gas-drying unit 11", and a gas pipe 28" connects the top of the gas-drying unit 11" with the lower end of the material-drying unit 10'. The construction of the apparatus of Fig. 2 is otherwise the same as that of Fig. 1. If desired, the upper and lower ends of the gas-drying units may be provided with transfer devices like the device 56, 57.

In the operation of the apparatus of Fig. 2, the moist gas from the material-drying unit 10' passes up the gas-drying unit 11' where most of the water vapor is removed by the calcium chloride. The partially dried gas then passes up the drying unit 11" where the gas is further dried, the water vapor reacting with the calcium carbide to form calcium hydroxide and acetylene gas. The circulating gas is either acetylene alone or a mixture of acetylene and carbon dioxide. Excess gas may be drawn off at any suitable point or points in the system. In some instances, the same kind of drying agent may be used in both gas-drying units. The acetylene has a ripening or mellowing effect on the fruit material.

In the modified form of apparatus shown in Fig. 3, a casing 61 is provided with a vertical partition 62 dividing the casing into two compartments 63 and 64 which communicate with each other at their lower ends. Access to the compartments is afforded by respective side doors 65 and 66 which have a suitable sealing engagement with the casing. A fan or blower 67 is arranged at the top of the casing to circulate a drying gas through the casing and has an intake conduit 68 connected to the top of the compartment 64 and a discharge conduit 69 connected to the top of the compartment 63. The compartment 63 is provided with horizontally extending guide rails 70 to support a series of vertically spaced slidable trays 71 for carrying the material 13 being dehydrated, and the compartment 64 is provided with horizontally extending guide rails 72 to support a series of vertically spaced slidable trays 73 for carrying a drying agent 33, such as calcium chloride, each tray 73 being provided above its bottom wall with a screen 74 to hold the calcium chloride and to permit drainage of condensate. The trays in each set are preferably arranged in staggered relation so as to provide a sinuous path for the circulating gas.

The drying gas is preferably carbon dioxide which is conveniently supplied in solid form, being placed either in one of the trays, such as the uppermost of the trays 73, or in a receptacle 75 having a duct 76 connected to the intake conduit 68 of the blower 67. A thermostatically controlled heat-exchanger 77 is provided to regulate the temperature of the circulating gas and is responsive to the temperature in the casing. The heat-exchanger is placed at any suitable point in the system and is here shown to be mounted on the outlet conduit 69 of the blower. The heat-exchanger is usually in the form of a heater, such as an electric heater. A purging valve 78 is provided to permit escape of displaced air when the casing is initially charged with the gaseous medium. The casing has a relief valve 79 to prevent excessive pressure in the casing.

In the operation of the apparatus of Fig. 3, the trays 71 and 73 are charged with reduced food material and calcium chloride, respectively, and after the casing is closed the system is filled with carbon dioxide gas, the air in the casing being displaced by the gas and escaping through the valve 78 which is temporarily opened. The gas, which is circulated through the casing by the blower 67, passes downwardly in a sinuous path through the compartment 63, and passes upwardly in a sinuous path through the compartment 64. The gas abstracts the moisture from the material and the calcium chloride absorbs the moisture from the gas. The circulating gas is maintained at a suitable temperature by the thermostatically controlled heat-exchanger 77. When the apparatus is used for drying citrus fruit peel, the interior of the casing is usually at room temperature or slightly higher. In some cases calcium carbide may be used as the gas-drying agent.

The food trays 71 and the drying agent trays 73 are here shown to be placed in different compartments of the casing, but in some instances these trays may be arranged alternately in both compartments.

In the modified form of apparatus shown in Fig. 4, the material-drying unit is in the form of a tube or tower 82 through which the material is sprayed downwardly into a rising current of the drying gas. The gas-drying unit 11 is like that of Fig. 1, and is connected to the tower 82 to form a closed gas circuit, as in the system of Fig. 1. The drying tower 82 includes a spray head 83 by which the material, in powdered or liquid form, is scattered or diffused. A receptacle 84 is arranged near the bottom of the tower to receive the dried material, the drying gas being passed upwardly around the receptacle. In some instances the receptacle may be porous to admit the drying gas therethrough. Instead of drying the material to a powdered form, the material may be partially dried, as to a syrupy consistency.

What I claim as new and desire to secure by Letters Patent is:

1. The method of treating organic material containing volatile flavoring substances, which comprises subjecting the material in subdivided form to a circulating drying gas in a closed circuit to remove water vapor from the material, removing said water vapor from the circulating gas, cooling the subdivided material after drying, withdrawing a minor portion of the gas through the dried and cooled subdivided material to recover volatile flavoring substances entrained in the gas, and adding drying gas to the closed circuit.

2. The method of treating fruit material which comprises subjecting the material to a drying gas comprising acetylene circulating in a closed circuit, and removing entrained water vapor from the circulating gas by passing the gas over calcium carbide.

3. The method of treating organic material, which comprises recirculating a gaseous drying medium in a closed circuit, exposing the material to the medium to remove moisture from the material, and passing the moisture-bearing medium over calcium carbide to dry the gaseous medium and to yield more of the gaseous drying medium.

4. The method of treating organic material, which comprises subjecting the material to a gaseous drying medium recirculating in a closed circuit, said medium comprising acetylene gas, passing the moisture-bearing medium over a primary absorber to remove the bulk of the moisture from the medium, and then passing the medium over calcium carbide to remove more of the moisture and to liberate additional acetylene.

ROYAL LEE.

REFERENCES CITED

The following references are of record in the file of this patent:

UNITED STATES PATENTS

| Number | Name | Date |
|---|---|---|
| 394,618 | Schindler | Dec. 18, 1888 |
| 825,595 | French | July 10, 1906 |
| 954,033 | Kiser | Apr. 5, 1910 |
| 1,102,714 | Bormann | July 7, 1914 |
| 1,322,428 | Gloess | Nov. 18, 1919 |
| 1,415,010 | Benjamin | May 9, 1922 |
| 1,453,750 | Christensen | May 1, 1923 |
| 1,475,938 | Denny | Dec. 4, 1923 |
| 1,536,291 | Glessner | May 5, 1925 |
| 1,702,311 | Patenburg | Feb. 19, 1929 |
| 1,716,791 | Ness | June 11, 1929 |
| 1,811,107 | Barneby | June 23, 1931 |
| 1,892,319 | Roth | Dec. 27, 1932 |
| 2,009,569 | Wallis et al. | July 30, 1935 |
| 2,060,430 | Spooner | Nov. 10, 1936 |
| 2,219,026 | Webb et al. | Oct. 22, 1940 |
| 2,274,948 | Ahlmann | Mar. 3, 1942 |
| 2,281,182 | Chopin | Apr. 28, 1942 |
| 2,376,095 | Shoeld | May 15, 1945 |

FOREIGN PATENTS

| Number | Country | Date |
|---|---|---|
| 321,373 | Germany | May 28, 1920 |